US009663630B2

(12) United States Patent
Bosnyak et al.

(10) Patent No.: US 9,663,630 B2
(45) Date of Patent: May 30, 2017

(54) POLYURETHANE POLYMERS AND COMPOSITIONS MADE USING DISCRETE CARBON NANOTUBES

(71) Applicant: Molecular Rebar Design, LLC, Austin, TX (US)

(72) Inventors: Clive P. Bosnyak, Dripping Springs, TX (US); Kurt W. Swogger, Austin, TX (US)

(73) Assignee: Molecular Rebar Design, LLC, Austin, TX (US)

( * ) Notice: Subject to any disclaimer, the term of this patent is extended or adjusted under 35 U.S.C. 154(b) by 9 days.

(21) Appl. No.: 13/936,362

(22) Filed: Jul. 8, 2013

(65) Prior Publication Data

US 2014/0011903 A1    Jan. 9, 2014

Related U.S. Application Data

(60) Provisional application No. 61/669,109, filed on Jul. 8, 2012, provisional application No. 61/737,025, filed on Dec. 13, 2012.

(51) Int. Cl.
*C08K 5/10*    (2006.01)
*C08J 5/04*    (2006.01)
(Continued)

(52) U.S. Cl.
CPC .............. *C08K 5/10* (2013.01); *C04B 14/026* (2013.01); *C04B 28/02* (2013.01); *C08J 5/005* (2013.01);
(Continued)

(58) Field of Classification Search
CPC .... C08G 18/10; C08K 2201/011; C08K 5/10; C08K 9/04; C08J 5/042; C08J 5/005;
(Continued)

(56) References Cited

U.S. PATENT DOCUMENTS 8,426,501 B1 *    4/2013  Taha .................. C04B 28/02
                                                  106/638
2003/0213939 A1 *  11/2003  Narayan ............... B82Y 10/00
                                                  252/500
(Continued)

FOREIGN PATENT DOCUMENTS

EP    2239290      * 10/2010
EP    1665446 B1    3/2012
(Continued)

OTHER PUBLICATIONS

Abstract and machine translation of KR-10-2010-0090856 obtained from the European Patent Office website on Jun. 3, 2015.*
(Continued)

*Primary Examiner* — Peter F Godenschwager
*Assistant Examiner* — Andrew J Oyer
(74) *Attorney, Agent, or Firm* — Stephen P. Krupp; Gregory L. Porter; Andrews Kurth Kenyon LLP

(57) ABSTRACT

In various embodiments a urethane/MOLECULAR REBAR formulation comprising a specific composition is disclosed. The composition comprises a urethane polymer or prepolymer/discrete carbon nanotube formulation. Utility of the urethane/MOLECULAR REBAR composition includes improved foams and adhesives.

23 Claims, 1 Drawing Sheet

(51) Int. Cl.

| | | |
|---|---|---|
| *C08J 5/00* | (2006.01) | |
| *C08J 5/06* | (2006.01) | |
| *C08K 9/04* | (2006.01) | |
| *C09K 8/467* | (2006.01) | |
| *C04B 28/02* | (2006.01) | |
| *C08J 9/00* | (2006.01) | |
| *C04B 14/02* | (2006.01) | |

(52) U.S. Cl.
CPC ............... *C08J 5/042* (2013.01); *C08J 5/06* (2013.01); *C08J 9/0076* (2013.01); *C08K 9/04* (2013.01); *C09K 8/467* (2013.01); *C08J 2207/02* (2013.01); *C08J 2300/22* (2013.01); *C08J 2375/04* (2013.01); *C08J 2400/22* (2013.01); *C08J 2475/04* (2013.01); *C08K 2201/011* (2013.01)

(58) Field of Classification Search
CPC ........ C08J 5/06; C08J 9/0076; C08J 2475/04; C08J 2400/22; C08J 2300/22; C08J 2375/04; C08J 2207/02; C09K 8/467; C04B 28/02; C04B 14/026
See application file for complete search history.

(56) References Cited

U.S. PATENT DOCUMENTS

| | | | | |
|---|---|---|---|---|
| 2006/0137817 | A1* | 6/2006 | Ma | B01J 21/185 156/296 |
| 2007/0072991 | A1* | 3/2007 | Jana | C08G 18/0814 524/589 |
| 2008/0132632 | A1* | 6/2008 | Schiraldi | C08K 9/08 524/445 |
| 2008/0134942 | A1* | 6/2008 | Brenner | C04B 28/04 106/672 |
| 2009/0035469 | A1* | 2/2009 | Sue | B82Y 30/00 427/282 |
| 2011/0024694 | A1 | 2/2011 | Shah et al. | |
| 2011/0281071 | A1* | 11/2011 | Vogel | B82Y 30/00 428/143 |
| 2011/0311876 | A1 | 12/2011 | Sturgeon et al. | |
| 2012/0029162 | A1* | 2/2012 | Vogel | B82Y 30/00 528/76 |
| 2012/0178877 | A1* | 7/2012 | Rathje et al. | 524/770 |
| 2012/0183770 | A1* | 7/2012 | Bosnyak | B82Y 30/00 428/367 |

FOREIGN PATENT DOCUMENTS

| | | | |
|---|---|---|---|
| KR | 10-2010-0090856 | * | 8/2010 |
| WO | 2009/155267 | | 12/2009 |
| WO | WO-2010086094 A1 | * | 8/2010 |
| WO | 20110163129 | | 12/2011 |
| WO | 2012/083358 | | 6/2012 |
| WO | 20120138803 | | 10/2012 |
| WO | 2013/011516 | | 1/2013 |

OTHER PUBLICATIONS

European Patent Office; Response to Written Opinion; PCT Application No. PCT/US2013/049533; Apr. 17, 2014.
European Patent Office; Second Written Opinion; PCT Application No. PCT/US2013/049533; Jun. 16, 2014.
European Patent Office; Response to Second Written Opinion; PCT Application No. PCT/US2013/049533; Aug. 18, 2014.
European Patent Office; International Preliminary Report on Patentability; PCT Application No. PCT/US2013/049533; Sep. 30, 2014.
European Patent Office; International Search Report and Written Opinion; PCT Application No. PCT/US2013/049533; Sep. 23, 2013.
Database WPI, Week 200809, Thomson Scientific, AN 2008-B34857, XP002712447 & JP 2008 001866 A, Toyo Rubber Ind Co Ltd, Jan. 10, 2008.
Database WPI, Week 200944, Thomson Scientific, AN 2009-K10577, XP002712457 & CN 101 440 208 A, Univ Donghua, May 27, 2009.
Database WPI, Week 201240, Thomson Scientific, AN 2012-D49666, XP002712458 & KR 2012 0021794 A, Toray Advanced Materials Korea Inc., Mar. 9, 2012.
Hocke, Presentation—"Bayer Material Science: Baytubes, Carbon Nanotubes@Bayer", (Jun. 1, 2010).
Tsubokawa, "Preparation and Properties of Polymer-Grafted Carbon Nanotubes and Nanofibers", 37(9) Polymer J. (2005), pp. 637-655.

* cited by examiner

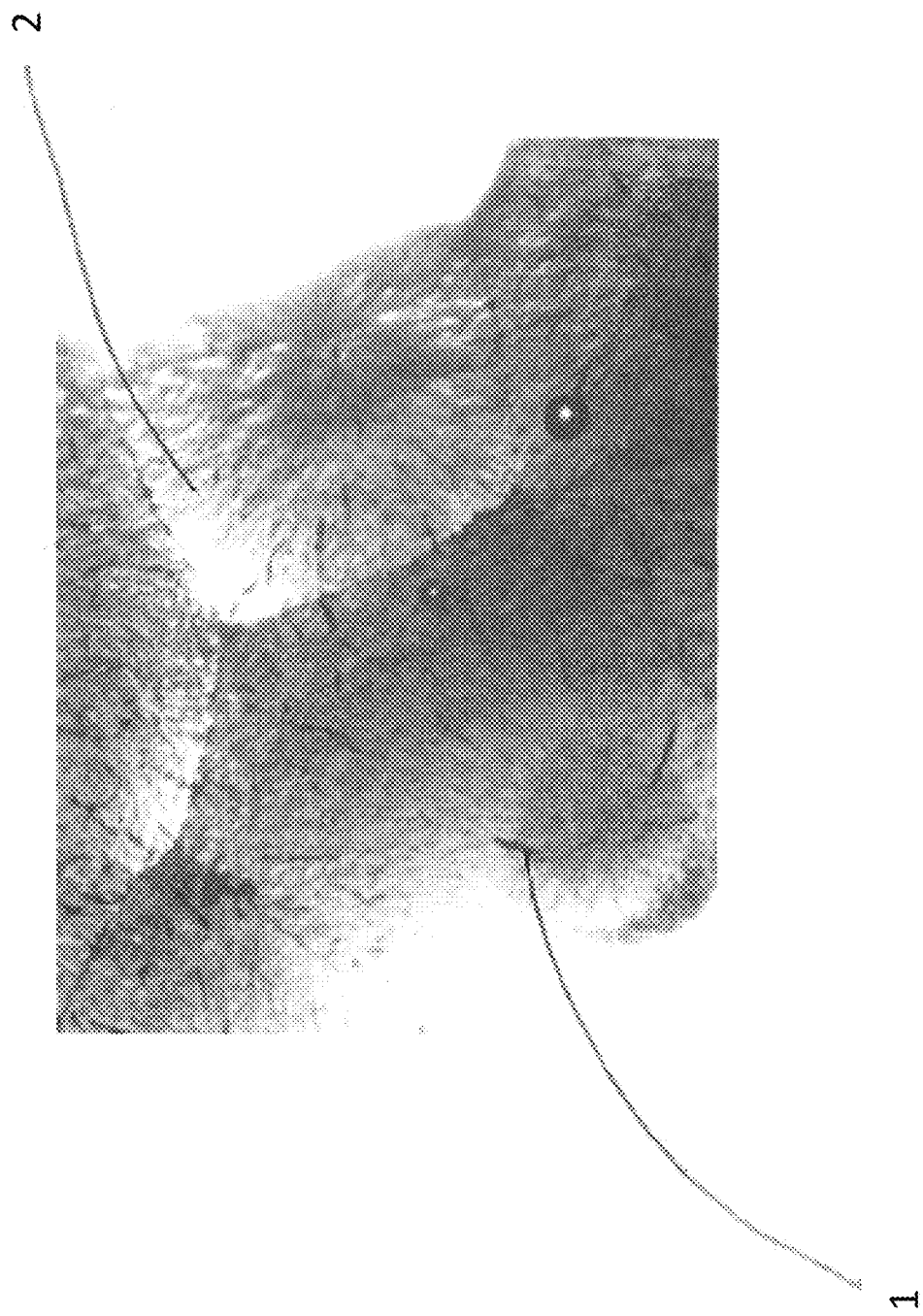

POLYURETHANE POLYMERS AND COMPOSITIONS MADE USING DISCRETE CARBON NANOTUBES

CROSS REFERENCE TO RELATED APPLICATIONS

This patent application claims priority to U.S. Provisional Patent Application No. 61/669,109, filed Jul. 8, 2012, and titled "POLYURETHANE POLYMERS AND COMPOSITIONS MADE USING DISCRETE CARBON NANOTUBE MOLECULAR REBAR" as well as U.S. Provisional Patent Application No. 61/737,025, filed Dec. 13, 2012, and titled "POLYURETHANE POLYMERS AND COMPOSITIONS MADE USING DISCRETE CARBON NANOTUBE MOLECULAR REBAR"; and is related to U.S. Ser. No. 13/164,456 filed Jun. 20, 2011; U.S. Ser. No. 12/968,151 filed Dec. 14, 2010; U.S. Ser. No. 13/140,029 filed Dec. 18, 2009; U.S. Ser. No. 61/500,561 filed Jun. 23, 2011; U.S. Ser. No. 61/500,560 filed Jun. 23, 2011; and U.S. Ser. No. 61/638,454 filed Apr. 25, 2012; the disclosures of which are incorporated herein by reference.

BACKGROUND

Carbon nanotubes in various forms have been disclosed. However, conventional carbon nanotubes, in the form of fibers or fibrils, are "clumped" together, making them less than ideal or even useful to their full potential, due to the entangled nature of the fibers. The present invention provides a method for separating these nanotubes into individual fibers and fibrils, and these separated "discrete" (un-entangled) carbon nanotube fibers are useful in many applications, including reinforcement of other materials. In an embodiment of the present invention, discrete carbon nanotube fibers are used in urethane polymers and prepolymers, especially for making rigid and flexible foams, adhesives, sealants, coatings, and elastomers.

SUMMARY

One embodiment of the present invention is a composition comprising at least one urethane based polymer or pre-polymer and at least a portion of discrete carbon nanotube MOLECULAR REBAR to form or polymerize into a polyurethane/MOLECULAR REBAR formulation.

Another embodiment is a composition comprising at least one urethane based polymer or pre-polymer and at least a portion of discrete carbon nanotube molecular rebar, wherein the urethane polymer or pre-polymer comprises at least one polyol and/or at least one isocyanate, and wherein the discrete carbon nanotube molecular rebar is contacted with at least one of the polyol, the urethane polymer or pre-polymer.

Preferably the discrete carbon nanotube molecular rebar is contacted with the polyol. The discrete carbon nanotubes can be contacted with the polyol prior to, during and/or after polymerization. The discrete carbon nanotube molecular rebar can be contacted with the isocyanate prior to, during and/or after polymerization.

The isocyanate can comprise aromatic or aliphatic groups, preferably hexamethylene diisocyanate, more preferably toluene diisocyanate or most preferably diphenylmethane diisocyanate.

The portion of discrete carbon nanotubes can be open ended, resulting from dissolving catalyst particles integral to the initially closed carbon nanotubes.

The composition can further comprise at least one polymer other than urethane polymer or prepolymer. The polymer can be selected from the group consisting of vinyl polymers, preferably poly(styrene-butadiene), partially or fully hydrogenated poly(styrene butadiene) containing copolymers, functionalized poly(styrene butadiene) copolymers such as carboxylated poly(styrene butadiene) and the like, poly(styrene-isoprene), poly(methacrylic acid), poly (acrylic acid), poly(vinylalcohols), and poly(vinylacetates), fluorinated polymers, preferably poly(vinylidine difluoride) and poly(vinylidene difluoride) copolymers, conductive polymers, preferably poly(acetylene), poly(phenylene), poly (pyrrole), and poly(acrylonitrile), polymers derived from natural sources, preferably alginates, polysaccharides, lignosulfonates, and cellulosic based materials, polyethers, polyesters, polyurethanes, and polyamides, either as graft, block or random copolymers, and mixtures thereof.

The carbon nanotubes can be further functionalized, preferably comprising a molecule of mass greater than 50 g/mole and more preferably comprising carboxylate, hydroxyl, ester, ether, or amide moieties, or mixtures thereof.

The discrete carbon nanotubes can have a residual metals level of less than about 4% by weight of the carbon nanotubes. The carbon nanotube fibers can comprise an oxidation content from about 1 weight percent to about 15 weight percent. The discrete carbon nanotube fibers comprise from about 0.1 weight percent to about 90 weight percent, preferably from about 0.5 to about 49 weight percent of the composition.

The composition can be in the form of free flowing particles.

The composition can comprise additional inorganic structures. The additional inorganic structures can comprise elements selected from the groups two through fourteen of the Periodic Table of Elements, preferably wherein the elements are selected from the group consisting of silver, gold, silicon, vanadium, titanium, chromium, iron, manganese, tin, nickel, palladium, platinum, cobalt, aluminum, gallium, germanium, indium, antimony, copper and zinc, cadmium, mercury, or mixtures thereof including oxides and other derivatives. The additional inorganic structures can also comprise non-fiber carbon structures, such as components selected from the group consisting of carbon black, graphite, graphene, oxidized graphene, fullerenes and mixtures thereof.

Another embodiment of the invention is a foam comprising the inventive formulations, wherein the foam at a given density has increased rigidity, increased strength, improved ability to form foams, improved crush resistance, and improved static electricity transmission, compared to a formulation in the absence of discrete carbon nanotube MOLECULAR REBAR.

A further embodiment is an adhesive comprising the formulations, wherein the adhesive has improved adhesion and cohesion and improved electrical properties versus a comparison adhesive made with an absence of discrete carbon nanotube MOLECULAR REBAR.

A fourth embodiment is a cement comprising MOLECULAR REBAR, wherein the cement has improved crack resistance, preferably with improved adhesion to other materials placed in contact with the cement compared to the cement without MOLECULAR REBAR. The cement comprising MOLECULAR REBAR is especially useful in the oil and gas drilling and processing industry, nuclear energy generation industry, mining and power generation industries. Mortar comprising the cement of the inventive formulations for cement blocks and rocks resists cracking and crumbling which insure longer life compared to a mortar without MOLECULAR REBAR.

Another embodiment is a process to form a composition comprising polyurethane/discrete carbon nanotube MOLECULAR REBAR formulation comprising the steps of:
a) selecting discrete carbon nanotube fibers having an aspect ratio of from 10 to 500,
b) selecting discrete carbon nanotube fibers having an oxidation level from about 1 to about 15% by weight,
c) selecting discrete carbon nanotubes wherein at least a portion of the tubes are open ended,
d) blending the discrete carbon nanotube fibers with a urethane polymer or prepolymer to form a urethane/discrete carbon nanotube carbon fiber mixture,
e) optionally polymerizing the urethane/fiber mixture with a polyol and/or a isocyanate to form a polyurethane/molecular rebar formulation,
f) optionally combining the urethane/discrete carbon fiber nanotube mixture with additional inorganic structures, and
g) optionally agitating or sonicating, preferably sonicating, the urethane/discrete carbon fiber nanotube mixture to a degree sufficient to disperse the fibers.

BRIEF DESCRIPTION OF DRAWINGS

The following drawings form part of the present specification and are included to further demonstrate certain aspects of the present invention. The invention may be better understood by reference to one or more of these drawings in combination with the detailed description of specific embodiments presented herein.

FIG. 1 shows a high magnification optical photograph of MOLECULAR REBAR 1 (discrete carbon nanotubes) dispersed in polyethylene oxide. The polyethylene oxide has crystallized exhibiting well-known spherulites. The discrete carbon nanotubes of this invention are located essentially at the boundary of the crystalline-amorphous region and within the amorphous (non-crystalline fraction) as illustrated by the arrow 1 in the figure. Arrow 2 shows the crystalline lamellar arm of the spherulite.

DETAILED DESCRIPTION

In the following description, certain details are set forth such as specific quantities, sizes, etc. so as to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

While most of the terms used herein will be recognizable to those of ordinary skill in the art, it should be understood, however, that when not explicitly defined, terms should be interpreted as adopting a meaning presently accepted by those of ordinary skill in the art. In cases where the construction of a term would render it meaningless or essentially meaningless, the definition should be taken from Webster's Dictionary, 3rd Edition, 2009. Definitions and/or interpretations should not be incorporated from other patent applications, patents, or publications, related or not, unless specifically stated in this specification.

The general term "polyurethane" is given to polymers prepared according to the diisocyanate-polyaddition principle with a basic building block of a urethane linkage —NCO+HO—=>NI—CO—O—. They can incorporate a large variety of other chemical moieties including, but not limited to, ether, ester and urea groups. These products can be named polyetherureas, polyureas, polyisocyanurates and polycarbodiimides and contain quantities of urethane linkages as low as about 4% by number of all linkages in the polymer. They can be made in the form of closed or open cell foams, coatings, fibers or solid films and sheets. The mechanical properties of the polyurethanes at 25° C. can range from rigid to flexible dependent on the amount of the "soft phase" i.e., moieties with a glass transition temperature less than 25° C. and the amount of "hard phase" i.e., moieties with a glass transition or a crystalline segment melting point higher than about 25° C.

Typical commercial diisocyanates are toluene diisocyanate (TDI), diphenylmethane (or methylene diphenyl) diisocyanate (MDI) and hexamethylene diisocyanate. Various isomers of these diisocyanates are available dependent on their method of manufacture. Typical soft phase components are i.e., polymers such as hydroxyl terminated polyethers with, for example molecular weight number average values up to 8000 g/mole. Diols, triols such as ethylene glycol and trimethylolpropane and polyfunctional hydroxyls such as penterythritol (or collectively, polyols) can be employed as chain extenders or crosslinkers with the diisocyanates. Diamines, triamines and polyamines can also be employed as more reactive entities than hydroxyls towards the diisocyanates.

Polyurethanes can also be made as water-borne or solvent-borne systems for coatings or adhesives. Additives such as, but not limited to, flame retardants, fillers such as mineral or glass, mold release agents, pigments, biocides, blocking agents, foam stabilizers and antioxidants, can be added to further provide desired features. Foam blowing agents include low boiling point fluids such as, but not limited to, carbon dioxide, water and fluorocarbons.

During the process of making discrete or exfoliated carbon nanotubes (which can be single, double and multi-wall configurations), the nanotubes are cut into segments with at least one open end and residual catalyst particles that are interior to the carbon nanotubes as received from the manufacturer are removed. This cutting of the tubes helps with exfoliation. The cutting of the tubes reduces the length of the tubes into carbon nanotube segments that are defined here as MOLECULAR REBAR. Proper selection of the carbon nanotube feed stock related to catalyst particle type and distribution in the carbon nanotubes allows more control over the resulting individual tube lengths and overall tube length distribution. A preferred selection is where the internal catalyst sites are evenly spaced and where the catalyst is most efficient. The preferred aspect ratio (length to diameter ratio) is greater than about 25 and less than about 100 for a balance of viscosity and mechanical performance. The selection can be evaluated using electron microscopy and determination of the discrete or exfoliated tube distribution.

MOLECULAR REBAR has oxidized species on the surface. Oxidized species include but not limited to carboxylates, hydroxyls and lactones. The oxidized species can react advantageously with species within the urethane such as an isocyanate, hydroxyl or amine group. This reaction increases the bonding strength between the MOLECULAR REBAR and the matrix. The MOLECULAR REBAR may further comprise a dispersing agent, adhesively or covalently bonded to the MOLECULAR REBAR surface. As a result of the aforementioned, MOLECULAR REBAR gives advantageous mechanical and transport properties when added to other materials compared to materials with no MOLECULAR REBAR.

The discrete oxidized carbon nanotubes (or DCNT), alternatively termed exfoliated carbon nanotubes, of the present disclosure take advantage of properties such as electrical, thermal, physical and ion transport, offered by individual carbon nanotubes that are not apparent when the carbon nanotubes are aggregated into bundles.

Discrete oxidized carbon nanotubes, alternatively termed exfoliated carbon nanotubes, are obtained from as-made bundled carbon nanotubes by methods such as oxidation using a combination of concentrated sulfuric and nitric acids. However, the techniques disclosed in U.S. Ser. Nos. 13/164,456 and 13/140,029, the disclosures of which are incorporated herein by reference, are particularly useful in producing the discrete carbon nanotubes used in this invention. The bundled carbon nanotubes can be made from any known means such as, for example, chemical vapor deposition, laser ablation, and high pressure carbon monoxide synthesis. The bundled carbon nanotubes can be present in a variety of forms including, for example, soot, powder, fibers, and bucky paper. Furthermore, the bundled carbon nanotubes may be of any length, diameter, or chirality. Carbon nanotubes may be metallic, semi-metallic, semi-conducting, or non-metallic based on their chirality and number of walls. The discrete oxidized carbon nanotubes may include, for example, single-wall, double-wall carbon nanotubes, or multi-wall carbon nanotubes and combinations thereof. One of ordinary skill in the art will recognize that many of the specific aspects of this invention illustrated utilizing a particular type of carbon nanotube may be practiced equivalently within the spirit and scope of the disclosure utilizing other types of carbon nanotubes.

Manufacture of Discrete Carbon Nanotubes of MOLECULAR REBAR

An illustrative process for producing discrete carbon nanotubes follows: 3 liters of sulfuric acid (containing 97 percent sulfuric acid and 3 percent water), and 1 liter of concentrated nitric acid (containing 70 percent nitric acid and 30 percent water), are added into a 10 liter temperature controlled reaction vessel fitted with a sonicator and stirrer. 40 grams of non-discrete carbon nanotubes, grade Flowtube 9000 from CNano corporation, are loaded into the reactor vessel while stirring the acid mixture and the temperature maintained at 30° C. The sonicator power is set at 130-150 watts and the reaction is continued for 3 hours. After 3 hours, the viscous solution is transferred to a filter with a 5 micron filter mesh and much of the acid mixture removed by filtering using a 100 psi pressure. The filter cake is washed one time with about 4 liters of deionized water followed by 1 wash of about 4 liters of ammonium hydroxide solution at pH greater than 9 and then 2 more washes with 4 liters of deionized water. The resultant pH of the final wash is 4.5.

A small sample of the filter cake is dried in vacuum at 100° C. for 4 hours and a thermo gravimetric analysis taken. The amount of oxidized species on the fiber is 4 percent weight and the average aspect ratio as determined by scanning electron microscopy to be 60. The discrete carbon nanotubes (CNT) in wet form are added to water to form a concentration by weight of 1 percent and the pH is adjusted to 9 using ammonium hydroxide. Sodium dodecylbenzene-sulfonic acid is added at a concentration of 1.5 times the mass of oxidized carbon nanotubes. The solution is sonicated while stirring until the CNT are fully dispersed in the solution. Sufficient dispersion of individual tubes (discrete) is defined when the UV absorption at 500 nm is above 1.2 absorption units for a concentration of $2.5 \times 10^{-5}$ g CNT/ml.

Functionalized carbon nanotubes of the present disclosure generally refer to the chemical modification of any of the carbon nanotube types described hereinabove. Such modifications can involve the nanotube ends, sidewalls, or both. Chemical modifications may include, but are not limited to covalent bonding, ionic bonding, chemisorption, intercalation, surfactant interactions, polymer wrapping, cutting, solvation, and combinations thereof Use the functionalization agents attached in some fashion chemically or mechanically to the MOLECULAR REBAR or discrete carbon nanotubes are useful to disperse the MOLECULAR REBAR in either the urethane component and/or the polyol component and to maintain the dispersion of the discrete carbon nanotubes during subsequent polymerization. Use of specific functionalization agents which can attach to the MOLECULAR REBAR in polyurethanes can react to the polyurethane structure, either in the hard segment or the soft segment of the urethane, or both the hard and the soft segment of the urethane.

Materials comprising discrete carbon nanotubes can have other additives such as other fibers (carbon, graphite, polymeric (polypropylene, polyethylene to name just a couple), and particulates (such as powders (carbon black), sand, diatomaceous earth, cellulose, colloids, agglomerates, anti-microbials)).

Additives can be included and can further react or be completely inert with other components of the formulation. Fibrous additives can be surface active to react with surroundings.

Individual discrete carbon nanotube fibers can have an aspect ratio of from about 10 to about 500, preferably 25-200 and most preferably 50-120. The aspect ratio of the discrete carbon nanotube fibers generally does not change significantly after processing into the end-use application. For example, the aspect ratio may change or reduce only a certain percentage of the original aspect ratio. Preventing the aspect ratio from significantly changing in discrete carbon nanotubes or MOLECULAR REBAR is important to prevent the MOLECULAR REBAR from becoming less effective for mechanical property improvements in the final end-use application. Polyurethane applications and dispersions especially benefit from a small aspect ratio change when forming the dispersion.

Generally, the aspect ratio in the final polyurethane containing mixture is at least about 50% to about 99% of the aspect ratio of the starting nanotube fibers. The lower range of the aspect ratio retention can be 60%, 70%, 80%, or 90%. Preferably the lower range of the aspect ratio retention is about 95% or greater than the original aspect ratio of the starting nanotube fibers. The higher range of the aspect ratio retention is 100% or less, 99% or less, 97% or less, 90% or less, 85% or less, or 75% or less. The preferred range of aspect retention ratio is from about 80% to about 99%. For example, if the aspect ratio, on average, is about 100, then the aspect ratio retention ratio preferably is from about 80% to about 99% of 100. That is, after processing into the fabricator article (or dispersion), the aspect ratio is about 80 to about 99. Similarly in another example, the aspect ratio retention for beginning aspect ratio of 200 would be about 160 to about 198. The lower end and the higher-end range of the aspect ratio retention as described herein can be mixed in any amount. That is the aspect ratio retention can be 60% to a high range of 75%. Or the aspect ratio retention can be 60% to a high range of 85%. Or the aspect ratio retention can be 60% to a high range of 99%. Similar ranges and combinations apply for various limits of the high and low ranges The discrete carbon nanotube fibers MOLECULAR REBAR (MR) can comprise 0.1 to 20% by weight of the formulation, preferably 0.2 to 10, more preferably 0.25 to 5% by weight of the formulation.

The discrete carbon nanotube fibers can all be about the same aspect ratio (length to diameter ratio) of +/− 10%, for example L/D from 90 to 110, or for another example L/D from 225 to 275; having uniform L/D is useful for evenly distributing load across a shaped article.

Based on application (such as reinforcing foam articles), 10% by weight or less of the discrete carbon nanotubes MR of the formulation can comprise L/D of about 100 to 200 and about 30% or more of the discrete carbon nanotubes MR of the formulation can comprise L/D of 40 to 80.

An additional embodiment of this invention comprises a composition including a plurality of discrete carbon nanotube fibers, said fibers having an aspect ratio of from about 10 to about 500, and wherein at least a portion of the discrete carbon nanotube fibers are open ended, preferably wherein 40% to 90% by number of the carbon nanotubes have an aspect ratio of 30-70, and more preferably aspect ratio of 40-60, and 1% to 30% by number of aspect ratio 80-140, most preferably an aspect ratio of 90 to 120. In statistics, a bimodal distribution is a continuous probability distribution with two different modes. These appear as distinct peaks (local maxima) in the probability density function. More generally, a multimodal distribution is a continuous probability distribution with two or more modes. The discrete carbon nanotubes can have a unimodal, bimodal or multimodal distribution of diameters and/or lengths. For example, the discrete carbon nanotubes can have a bimodal distribution of diameters wherein one of the peak values of diameter is in the range 1 to 7nanometers and the other peak value is in the range 10 to 40 nanometers. Likewise, the lengths of the discrete carbon nanotubes can have a bimodal distribution such that one peak has a maximum value in the range of 150 to 800 nanometers and the second peak has a maximum value in the range 1000to 3000 nanometers. Using specific aspect ratio distinct carbon nanotubes, or MOLECULAR REBAR, in compositions such as polyurethane, can have beneficial effects. These effects include more complete filling of interstitial voids in a final composition at a given volume fraction of carbon nanotube fibers, where carbon nanotubes fibers having a uniform L/D (aspect ratio) can leave unfilled areas devoid of fibers—leading to poorer mechanical reinforcement performance. Varying the aspect ratio, including use of specific modalities of aspect ratio, can provide an improved balance of rheology and uniform reinforcement of compositions, such as polyurethane compositions of the invention.

A further embodiment of this invention comprises discrete carbon nanotubes fibers, said fibers further comprising a blend of fibers having different functionality or different amounts of the same functionality. The weight ratio of the blend of fibers of different functionalities, or with different levels of the same functionality, can range from about 95/5 to 50/50, preferably range about 75/25 to 50/50. Specifically, 50 to 95 percent of the discrete carbon nanotube fibers can have a functionality attached to a level averaging at one level; (for example 10% by weight of the carbon nanotube fiber) where 5-50 percent of the discrete carbon nanotubes have a relative functionality level different from that of the first group by at least 10%. These functionalities can be the same or similar functionalities, or they can be entirely different Functionalities—depending on the end use application. The blend components of functionalized fibers may also contain specific modalities of aspect ratio. This includes placing functionality (e.g., 0.5 to 4%, on average 2%, weight of the functional groups on the carbon nanotube fibers) on discrete carbon nanotube fibers having a certain aspect ratio (such as relatively high L/D from about 300-600) and another level of (e.g., from 10% to 50%, on average 25% weight of the functional groups on the carbon nanotube fiber), the functionality being the same or different functionality on discrete carbon nanotubes having L/D from 60-120.

It is preferable for the discrete carbon nanotubes of the invention to comprise the functionalization; however non-discrete carbon nanotube fibers (such as that as originally made and consequently still entangled)—whether intentionally added to the compositions, or whether not made discrete and/or not functionalized—can be included in the compositions herein.

Any of the aspects disclosed in this invention with discrete carbon nanotubes may also be modified within the spirit and scope of the disclosure to substitute other tubular nanostructures, including, for example, inorganic or mineral nanotubes. Inorganic or mineral nanotubes include, for example, silicon nanotubes, boron nitride nanotubes and carbon nanotubes having heteroatom substitution in the nanotube structure. The nanotubes may include or be associated with organic or inorganic elements such as, for example, carbon, silicon, boron and nitrogen. Association may be on the interior or exterior of the inorganic or mineral nanotubes via Van der Waals, ionic or covalent bonding to the nanotube surfaces.

The flexural strength or resistance to cracking of the compositions can be determined by flexural bending of the composition on a thin aluminum or copper film in a 3-point bending fixture and an Instron Tensile Testing machine. The test is analogous to standard test procedures given in ASTM D-790. The stress to crack the composition through the thickness is recorded. Units are in MPa.

The adhesive strength of the compositions can be determined by using lap shear strength procedures and the Instron Tensile Testing Machine. The test is analogous to EN 1465. The specimen consists of two rigid substrates, for example aluminum sheets or copper sheets, bonded together by the composition in a lapped joint. This causes the two ends of the specimen to be offset from the vertical load line of the test. The composition is placed between two strip of material. The stress to failure on pulling the lapped specimen is recorded. Units are in MPa. The improvement in flow processability of the compositions can be determined using a rheometer, for example, utilizing concentric cylinders with a well-defined geometry to measure a fluid's resistance to flow and determine its viscous behavior. While relative rotation of the outer cylinder causes the composition to flow, its resistance to deformation imposes a shear stress on the inner wall of the cup, measured in units of Pa. At a certain shear stress, micro fracture of the composition can occur resulting in poor homogeneity.

Fabricated articles which can be usefully made with the invention include foams, both hard and soft, molded articles in general, including blow molded, injection molded, and other thermally formed molded articles. Dispersion's comprising the inventive compositions can also be formed. These dispersions can include plans with other materials. Or the dispersions of the invention can be used by themselves.

Using dispersed MOLECULAR REBAR in polyurethanes can improve many different physical properties, such as modulus, strength, fatigue properties, melt strength, coefficient of expansion, low temperature properties, static and conductive properties, and insulation properties. Insulation properties can be enhanced by incorporating MOLECULAR REBAR due to radiation absorption.

Using MOLECULAR REBAR in polyurethanes can improve physical properties of foams, including minimizing sidewall breakage because of the unique size and aspect ratio of MOLECULAR REBAR unlike most other materials.

Another embodiment of this invention comprises discrete carbon nanotubes fibers that have a sufficient number of defects within the wall or walls of the discrete carbon nanotube fibers such that they are allowed to curl and uncurl during at least one of the steps of forming a polyurethane. An example of defects that facilitate bending or curling along the length of the carbon nanotubes are Stone-Wales defects, which are the rearrangement of the six-membered rings of graphene into heptagon-pentagon pairs that fit within the hexagonal lattice of fused benzene rings constituting a wall of the carbon nanotubes.

Stone-Wales defects are thought to be more prevalent at the end caps that allow higher degrees of curvature of the walls of carbon nanotubes. During oxidation the ends of the carbon nanotubes can be opened and also result in higher degrees of oxidation than along the walls. The higher degree of oxidation and hence higher polarity or hydrogen bonding at the ends of the tubes are thought useful to help increase the average contour length to end to end distance ratio where the tubes are present in less polar media such as natural rubber, cis-butadiene, styrene butadiene, isoprene, polystyrene, acrylonitrile butadiene. The ratio of the contour length to end to end distance can be advantageously controlled by the degree of thermodynamic interaction between the tubes and the medium. Surfactants can be usefully employed also to modify the thermodynamic interactions between the tubes and the medium of choice.

A ratio of the average contour length to end to end distance greater than about 1.2 is advantageous to reduce the viscosity of the mixture of polyol and/or isocyanate containing discrete carbon nanotube fibers, relative to the same weight fraction of discrete carbon nanotubes that have average contour length to end to end distance in the range 1 to 1.1. The reduced viscosity is advantageous for improved mixing of the components and fabrication into fibers, foams or films, particularly where the product also requires impregnation of the polyurethane containing discrete carbon nanotube fibers into fiber matts, such as glass fiber matts or aramid fiber matts (KEVLAR or NOMEX, from Du Pont) for further reinforcement of mechanical properties. The ability for the discrete carbon nanotube fiber to uncurl to some degree is particularly advantageous for foams where the discrete carbon nanotubes are expected to fit within the cell wall or strut without causing premature rupture of the cell wall or strut. As the foam cell is growing there is orientation of the material which enables the discrete carbon nanotube fibers with defects to reduce the ratio of the average contour length to end to end distance. The reduction of the ratio of the average contour length to end to end distance by orientation or dilution in the medium is at least 10% or more, preferably at least 20% or more, and most preferably 50% or more.

Crystallization Enhancement

By forming discrete carbon nanotubes known as MOLECULAR REBAR, and their addition in materials, crystallization enhancement has been observed for various polymers and polymer components. This enhanced crystallization is very beneficial for forming higher rigidity materials and more crystalline structures including what are essentially noncrystalline materials. These essentially non-crystalline materials include synthetic and natural rubber. Crystallization enhancement for essentially non-crystalline materials (less than about 2% by weight crystallinity as determined by differential scanning calorimetry or x ray diffraction), or essentially amorphous materials, such as rubber, is useful to increase their thermo-mechanical properties or strength of resulting compositions. These compositions can include other additives such as carbon black or silica for reinforcement. By forming crystals, even in small amounts, the useful temperature range for resulting compositions is increased. So for example, a natural rubber enhanced with discrete carbon nanotubes or MOLECULAR REBAR has an elevated useful temperature range higher than that for the same natural rubber modified with non-discrete carbon nanotubes ("bird nests" or agglomerations). Similar behavior for other polymers and materials is useful by incorporating discrete carbon nanotubes or MOLECULAR REBAR.

Typical amorphous or non-crystalline polymers do not have a melting point, but rather a melting range. By incorporating MOLECULAR REBAR (discrete carbon nanotubes), crystals can be formed in an otherwise amorphous polymer. These crystals are then "tied" to each other by the interconnectivity of the MOLECULAR REBAR, acting to reinforce and enhance the mechanical and thermal properties. MOLECULAR REBAR acts as a type of nucleating agent, but it does more, since the matrix is now reinforced with molecular level carbon nanotubes. Typical property enhancements are at least 10 percent higher than the same property without incorporating MOLECULAR REBAR. However, these property improvements are usually much higher than 10 percent, and can range to as much as 100percent improvement, or more.

Semi-crystalline polymers also benefit from addition of MOLECULAR REBAR. Incorporating discrete carbon nanotubes can increase the crystal formation of the resultant thermally formed polymer. Such thermal forming can depend on various factors, but typically the polymer or polymer blend containing the MOLECULAR REBAR is heated to form into a part, and then cooled. Cooling can take place gradually, or cooling can be controlled at certain temperatures per minute. Rapid quench can also be employed, and the resultant crystal size, and even content, may depend on the cooling degree and cooling rate. Generally, rapid quench results in smaller crystals while slow, gradual quench conditions allow larger crystal growth. Incorporating MOLECULAR REBAR, at varying concentration or aspect ratios (or distributions of aspect ratios) has now been found to influence crystal formation and tie molecule interconnectivity. MOLECULAR REBAR in polymers, such as semi-crystalline polymers, interacts with the polymer molecules, resulting in stronger and tougher polymer compositions.

For both amorphous and semi-crystalline polymers, on addition of MOLECULAR REBAR the degree of crystallinity can increase by as little as 1 percent, or can go up to as much as 75 percent compared to the same polymer with no MOLECULAR REBAR. Typical increase in crystallinity is from about 1 percent to about 50 percent, preferably from about 1percent to about 40 percent, more preferably from about 1 percent to about 30 percent, and especially from about 1 percent to about 20 percent. All percents described with respect to crystallinity are based on weight percent of the selected polymer. Crystallinity is typically measured from the endotherm of a thermogram obtained by differential scanning calorimetry, but can also be determined by X-ray spectroscopy.

Semi-crystalline polymers which can be modified by incorporating MOLECULAR REBAR include polyethylene such as single site polymers, for example EXACT (Exxon), AFFINITY and ENGAGE (Dow), Ziegler-Natta polymers (DOWLEX by Dow, and FLEXOMER by Union Carbide—now Dow) and high pressure, free radical low density polyethylene (LDPE). Both polyethylene and polypropylene polymers can include various copolymers of ethylene or propylene and at least one alpha-olefin (such as hexene, butane, propene, octene) and combinations of comonomers (terpolymers for instance)). Examples of propylene copolymers include VERSIFY (Dow). Homopolymers (ethylene and propylene) can also benefit from addition of discrete carbon nanotubes. Other types of ethylene polymers include ELITE (Dow) and INFUSE olefin block copolymers ((Dow).

Other polymers and copolymers can also utilize MOLECULAR REBAR and including, but not limited to, ethylene/acrylic acid copolymers, such as PRIMACOR (Dow) and VISTAMAXX (Exxon) and NUCREL (DuPont) (and ionomers made therefrom such as SURLYN (DuPont)), polyethers, polyesters, fluorinated polymers, and polyamides.

Blends of polymers disclosed herein can also be employed using the MOLECULAR REBAR to aid crystallization. Such polymer blends are not merely limited to those recited herein, but can include others, to the extent the ultimate polymer blend can still be processed and useful.

What is claimed is:

1. A composition comprising the reaction product of at least one urethane based polymer or pre-polymer and at least a portion of discrete oxidized multiwall carbon nanotubes having an original aspect ratio of from about 10 to about 500 wherein the retained aspect ratio of the discrete oxidized carbon nanotubes in the reaction product is at least about 60% or greater of the original aspect ratio.

2. A composition comprising the reaction product of at least one urethane based polymer or pre-polymer and at least a portion of discrete oxidized multiwall carbon nanotubes having an original aspect ratio of from about 10 to about 500, wherein the urethane based polymer or prepolymer comprises at least one polyol and/or at least one isocyanate, and wherein the discrete oxidized carbon nanotubes are polymerized with the urethane polymer or pre-polymer and wherein the retained aspect ratio of the discrete oxidized carbon nanotubes in the reaction product is at least about 60% or greater of the original aspect ratio.

3. The composition of claim 2 wherein the urethane based polymer or pre-polymer comprises at least one polyol.

4. The composition of claim 2 wherein the isocyanate comprises aromatic or aliphatic groups.

5. A cement comprising discrete oxidized multiwall carbon nanotubes having an original aspect ratio of from about 10 to about 500 wherein the retained aspect ratio of the discrete oxidized carbon nanotubes in the cement is at least about 60% or greater of the original aspect ratio, wherein the cement has improved crack resistance as determined by flexural bending of the composition on a thin aluminum or copper film in a 3-point bending fixture and an Instron Tensile Testing machine.

6. A cement comprising discrete oxidized multiwall carbon nanotubes having an original aspect ratio of from about 10 to about 500 wherein the retained aspect ratio of the discrete oxidized carbon nanotubes in the cement is at least about 60% or greater of the original aspect ratio.

7. A mortar comprising the cement of claim 6 for use with cement blocks and rocks, wherein the mortar resists cracking and crumbling to insure longer life compared to a mortar without discrete oxidized carbon nanotubes.

8. The composition of claim 1 where the portion of discrete oxidized carbon nanotubes are open ended.

9. The composition of claim 1 further comprising at least one polymer other than the at least one urethane based polymer or prepolymer.

10. The composition of claim 1 wherein the portion of discrete oxidized carbon nanotubes are further functionalized.

11. The composition of claim 1 wherein the discrete oxidized carbon nanotubes have a residual metals level of less than about 4% by weight of the carbon nanotubes.

12. The composition of claim 9 wherein the at least one polymer other than the at least one urethane based polymer or prepolymer is selected from the group consisting of vinyl polymers; fluorinated polymers; conductive polymers; polymers derived from natural sources; and cellulosic based materials; polyethers; polyesters; and polyamides, either as graft, block or random copolymers; and mixtures thereof.

13. The composition of claim 1 wherein the discrete oxidized carbon nanotubes comprise from about 0.1 to about 90 weight percent of the composition.

14. The composition of claim 1 in the form of free flowing particles.

15. The composition of claim 1 comprising additional inorganic structures.

16. The composition of claim 15 wherein the additional inorganic structures comprise elements selected from the groups two through fourteen of the Periodic Table of Elements.

17. The composition of claim 15 wherein the additional inorganic structures are selected from the group consisting of silver, gold, silicon, vanadium, titanium, chromium, iron, manganese, tin, nickel, palladium, platinum, cobalt, aluminum, gallium, germanium, indium, antimony, copper and zinc, cadmium, mercury, and mixtures thereof including oxides and other derivatives.

18. The composition of claim 15 wherein the additional inorganic structures comprise non-fiber carbon structures.

19. The composition of claim 18 wherein the non-fiber carbon structures comprise components selected from the group consisting of carbon black, graphite, graphene, oxidized graphene, fullerenes and mixtures thereof.

20. The composition of claim 1 wherein the retained aspect ratio of the discrete oxidized carbon nanotubes in the reaction product is at least about 90% or greater of the original aspect ratio.

21. The composition of claim 2 wherein the retained aspect ratio of the discrete oxidized multiwall carbon nanotubes in the reaction product is at least about 90% or greater of the original aspect ratio.

22. The cement of claim 5 wherein the retained aspect ratio of the discrete oxidized multiwall carbon nanotubes in the cement is at least about 90% or greater of the original aspect ratio.

23. The cement of claim 6 wherein the retained aspect ratio of the discrete oxidized multiwall carbon nanotubes in the cement is at least about 90% or greater of the original aspect ratio.

* * * * *